(12) United States Patent
Yuan et al.

(10) Patent No.: US 8,886,574 B2
(45) Date of Patent: Nov. 11, 2014

(54) GENERALIZED PATTERN RECOGNITION FOR FAULT DIAGNOSIS IN MACHINE CONDITION MONITORING

(75) Inventors: Chao Yuan, Plainsboro, NJ (US); Amit Chakraborty, East Windsor, NJ (US); Leif Wiebking, Karlsruhe (DE); Holger Hackstein, Dietzenbach (DE)

(73) Assignee: Siemens Aktiengesellschaft, Munich (DE)

( * ) Notice: Subject to any disclaimer, the term of this patent is extended or adjusted under 35 U.S.C. 154(b) by 312 days.

(21) Appl. No.: 13/494,234

(22) Filed: Jun. 12, 2012

(65) Prior Publication Data

US 2013/0332773 A1    Dec. 12, 2013

(51) Int. Cl.
G06F 15/18 (2006.01)
G05B 23/02 (2006.01)
G06N 99/00 (2010.01)

(52) U.S. Cl.
CPC .......... *G05B 23/024* (2013.01); *G05B 23/0205* (2013.01); *G06N 99/005* (2013.01); *Y10S 706/904* (2013.01)
USPC ............................................. 706/12; 706/904

(58) Field of Classification Search
CPC ........... G05B 23/0205; G05B 23/0218; G05B 23/0229; G05B 23/024; G06N 99/005
USPC .................................................. 706/12, 904
See application file for complete search history.

(56) References Cited

U.S. PATENT DOCUMENTS

| | | | |
|---|---|---|---|
| 7,343,023 B2* | 3/2008 | Nordqvist et al. | 381/321 |
| 7,406,653 B2* | 7/2008 | Ide et al. | 714/799 |
| 7,778,632 B2* | 8/2010 | Kurlander et al. | 455/418 |
| 8,301,333 B2* | 10/2012 | Singh et al. | 701/31.4 |
| 2002/0128799 A1* | 9/2002 | Loecher | 702/181 |
| 2002/0152056 A1* | 10/2002 | Herzog et al. | 703/2 |
| 2010/0138368 A1* | 6/2010 | Stundner et al. | 706/12 |
| 2012/0005134 A1* | 1/2012 | Jaros et al. | 706/12 |
| 2012/0041575 A1* | 2/2012 | Maeda et al. | 700/80 |
| 2014/0163812 A1* | 6/2014 | Randerath et al. | 701/32.9 |

OTHER PUBLICATIONS

Chen, DM. "A Standardized Probability Comparison Approach for Evaluating and Combining Pixel-based Classification Procedures." Photogrammetric Engineering & Remote Sensing 74.5 (2008): pp. 601-609.*

Filev, D.P. et al. "An industrial strength novelty detection framework for autonomous equipment monitoring and diagnostics." Industrial Informatics, IEEE Transactions on 6.4 (2010): pp. 767-779. DOI: 10.1109/TII.2010.2060732.*

Venkatasubramanian, V. et al. "A review of process fault detection and diagnosis: Part III: Process history based methods." Computers & chemical engineering 27.3 (2003): pp. 327-346. DOI: 10.1016/S0098-1354(02)00162-X.*

(Continued)

*Primary Examiner* — Jeffrey A Gaffin
*Assistant Examiner* — Benjamin Buss (57) ABSTRACT

A generalized pattern recognition is used to identify faults in machine condition monitoring. Pattern clusters are identified in operating data. A classifier is trained using the pattern clusters in addition to annotated training data. The operating data is also used to cluster the signals in the operating data into signal clusters. Monitored data samples are then classified by evaluating confidence vectors that include substitutions of signals contained in the training data by signals in the same signal clusters as the signals contained in the training data.

22 Claims, 3 Drawing Sheets

(56) References Cited

OTHER PUBLICATIONS

Yang, B.-S. et al. "Application of Dempster-Shafer theory in fault diagnosis of induction motors using vibration and current signals." Mechanical Systems and Signal Processing 20.2 (2006): pp. 403-420. DOI: 10.1016/j.ymssp.2004.10.010.*

Lall, P. et al. "Fault-mode classification for health monitoring of electronics subjected to drop and shock." Electronic Components and Technology Conference, 2009. ECTC 2009. 59th. IEEE, 2009. pp. 668-681. DOI: 10.1109/ECTC.2009.5074086.*

Gabrys et al., "Combining labelled and unlabelled data in the design of pattern classification systems", International Journal of Approximate Reasoning, Elsevier Science, NY, NY, vol. 35, No. 3, Mar. 1, 2004, pp. 251-273.

Foued et al., "New approach for systems monitoring based on semi-supervised classification", Communications, Computing and Control Applications (CCCA), 2011 International Conference on IEEE, Mar. 3, 2011, pp. 1-6.

International Search Report dated Oct. 2, 2013.

* cited by examiner

| SIGNAL CLUSTER | SIGNAL | SYMPTOM 1 | SYMPTOM 2 | ... | SYMPTOM $K$ |
|---|---|---|---|---|---|
| 1 | $s_1$ | 0.60 | 0.10 | ... | 0.20 |
| | $s_2$ | 0.20 | 0.50 | ... | 0.30 |
| | $s_3$ | 0.10 | 0.10 | ... | 0.00 |
| 2 | $s_4$ | 0.15 | 0.25 | ... | 0.40 |
| | $s_5$ | 0.05 | 0.90 | ... | 0.00 |
| ... | ... | ... | ... | ... | ... |
| $R$ | $s_{O-1}$ | 0.50 | 0.40 | ... | 0.05 |
| | $s_O$ | 1.00 | 0.00 | ... | 0.00 |

GENERALIZED PATTERN RECOGNITION FOR FAULT DIAGNOSIS IN MACHINE CONDITION MONITORING

FIELD OF THE INVENTION

This invention relates generally to machine condition monitoring, and more particularly to methods, systems and computer readable media for detecting machine failures from limited training data using supervised pattern-recognition-based techniques.

BACKGROUND OF THE INVENTION

The task of machine condition monitoring is to detect machine failures at an early stage such that maintenance can be carried out in a timely manner. In the case of failure, it is very important to know the cause of this failure so that corresponding localized, and thus more efficient, maintenance can be applied.

Rule-based systems are perhaps the most widely used condition monitoring approaches. The general format of a rule is "if a condition, then a fault type." Rules are defined by experts who possess the knowledge of the underlying system model; however, designing accurate rules is a very deliberate and time consuming process, especially for complex systems with many sensors and fault types. For example, it required 80 man years to develop one commercially successful condition monitoring rule base.

SUMMARY OF THE INVENTION

The present invention addresses the needs described above by providing a method for machine condition monitoring. Historic operating data including data from O signals over time is received by a computer. I patterns x are extracted from data from individual signals in the operating data. The I patterns are clustered into K pattern clusters $c_k$ based on similarities, and the O signals are clustered into R signal clusters based on correlations among the O signals.

An annotated training data sample is received, containing data from N signals selected from the O signals and having at least one marked failure time period. A K×N confidence vector is created containing K confidence values for each of the N signals, each confidence value representing a confidence that a pattern x extracted from data in the marked failure time period of a signal belongs to one of the K pattern clusters. A classifier is trained using the K×N confidence vector.

A monitored data sample is then received including data from the 0 signals. The monitored data sample is classified as indicating a failure based on at least one of the O signals not among the I signals being in a same signal cluster as one of the I signals and further based on a determination that the at least one of the O signals has confidence values similar to confidence values of the one of the I signals contained in the K×N confidence vector.

In another aspect of the invention, a non-transitory computer-usable medium is provided having computer readable instructions stored thereon for execution by a processor to perform methods for machine condition monitoring as described above.

DESCRIPTION OF THE INVENTION

The present disclosure focuses on an approach for using machine learning, and specifically, supervised pattern-recognition-based techniques. Machine learning models are data-driven: they are learned from training data automatically. That can be done very fast (for example, in minutes). If properly trained, machine learning models can describe complex fault conditions better than what is possible using rule bases.

Because machine learning techniques are data-driven, they require adequate training data to achieve the desired accuracy. The training data should represent both normal operation and failure modes. This requirement, however, is very difficult to meet. It is easy to obtain training data representing the normal condition because a machine should be operating normally during most of its lifespan. Obtaining training data representing a fault type, however, is rather challenging because certain types of faults may only occur rarely (even if we consider a collection of similar machines). Even for those few instances, the user is unlikely to spend time annotating all of them. It is thus very likely that only one training sample representing a failure is available, which makes the fault rather difficult to learn. In addition, during monitoring, the same failure type may be shown on different set of signals from the signals specified during training. It is therefore almost impossible to classify new failure patterns if a traditional classification approach is followed.

Figure 1:
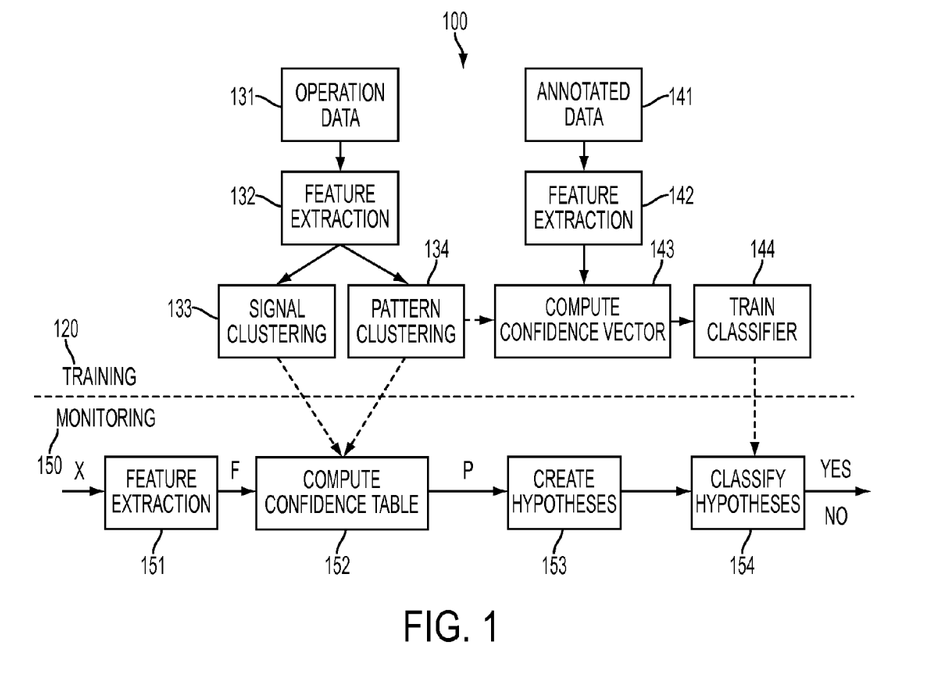
FIG. 1 is a schematic illustration of a machine condition monitoring tool in accordance with one embodiment of the invention.

A diagram 100 shown in FIG. 1 provides an overview of the presently proposed technique. The technique comprises two parts: a training part 120 and a monitoring part 150. The training part 120 additionally includes two sub-parts. In the first sub-part, operating data 131 are used. Features are extracted from the operating data at 132 and are used for signal clustering 133 and pattern clustering 134. In a second sub-part of the training 120, user-annotated data 141 undergo feature extraction 142 and are transformed into confidence vectors 143, which are used to train the classifier at 144.

During monitoring, the results from signal clustering and pattern clustering of extracted features 151 are used to compute a confidence value table 152 for test patterns. Candidate hypotheses are then created at 153 from the confidence value table. The most possible candidate hypothesis is classified at 154 to make the final decision ("yes" means that there is a failure and "no" means that the patterns are normal).

The presently described technique generalizes from limited training samples to fault signatures that may be expected during future monitoring. Two schemes of generalization, pattern clustering 134 and signal clustering 133 (FIG. 1) are proposed below to extract useful information from operating data of the machine or similar machines. Such operating data are readily available. The operating data may include user-annotated training data and un-annotated data, and may contain known or unknown failures.

In the pattern clustering scheme, patterns are generalized by clustering all patterns in the operating data. Each cluster can be viewed as a symptom. All patterns within the same cluster as the annotated pattern are similar and can be viewed as possible variations of the annotated patterns. The confidence of a pattern showing a symptom is also calculated to allow soft clustering.

In the signal clustering scheme, signals are generalized by clustering all signals using the operating data. The assumption is that similar symptoms for the same failure type may only occur on similar signals in future. During monitoring, instead of checking only the signals specified by annotation, all possible signals similar to the annotated signals are checked. Each possible candidate forms a hypothesis and the dominant hypothesis is used for making the final decision.

Problem Definition

During training, the user selects N signals, $s_1, s_2, s_N$ from a total of O available and meaningful signals. Those selected N signals may be original sensors (e.g., measuring temperature, pressures). They may also be results from previous data processing, such as calculated values (e.g., average of several original sensors) or residuals (deviation of a sensor value from its ideal value). In addition, the user marks the time period T between $t_0-T+1$ and $t_0$ when a failure occurred. Data annotation is illustrated by block 141 of FIG. 1.

The goal of the above annotation is to indicate what the failure looks like and when it occurred. The user can annotate L such instances of this failure. Ideally, only signals related to this failure should be selected. Similarly, only time stamps when the failure occurs should be marked. Let x, a T-dimensional vector, denote the pattern of a signal s such that $$x = [s(t_0-T+1), s(t_0-T+2), \ldots, s(t_0)]^T.$$

All N patterns may be put into a TN-dimensional combined pattern vector X $$X = [x_1^T, x_2^T, \ldots, x_N^T]^T.$$

Alternatively, a rule may be used to describe the failure. Let $$s \sim x$$

indicate that signal s shows pattern x. Using the above terminology, it may be said that the failure occurs if each signal shows the corresponding pattern such that $$s_1 \sim x_1$$
$$s_2 \sim x_2$$
$$\vdots$$
$$s_N \sim x_N.$$

If different failure instances have different data resolution or time duration T, they may be normalized by up-sampling or down-sampling the signals. From now on, it is assumed that all patterns are within the same time duration T and that they have the same resolution. T also indicates the number of data points for each pattern.

In addition to the annotation of the failure, the user may annotate normal operation of the machine. This normal operating time is usually much larger and is shown in multiple time ranges. It indicates what the signals look like when the machine is normal. A sliding window with a length of T is used to extract patterns from these annotated normal data to represent normal behavior. Suppose that there are M such examples.

The aim is to train a classifier based on the above annotated data. During monitoring, at every time stamp t, this trained classifier will be applied to the data of the N selected signals and make a decision about whether the failure occurs or not at t.

Feature Extraction

Pattern x is represented by the original signal values. It may not directly yield the most relevant information about the failure. Thus, it is useful to extract information or features $f(x)$ from the original pattern x such that $$f(x) = [f_1(x), f_2(x), \ldots, f_D(x)]^T.$$

Each feature $f_d(x)$ can be viewed as a transformation from the T-dimensional pattern x to a scalar, where d=1, 2, ..., D.

Possible features include but are not limited to the following

Original signal values. $f(x)=x$.
Subspace projection. x is projected to a lower subspace such as a space spanned by principal components. The projections are used as features.
Fourier transform (if pattern x is usually stationary).
Wavelet transform (if pattern x is usually non-stationary).
Histogram. All possible values of a data point in x are divided into bins. The percentage of the count in each bin is used as a feature.

The final $f(x)$ can be a combination of above features. In any case, $f(x)$ extracted from a pattern x is generally a vector with a dimension of D. For example, if $f$ is the Fourier transform and T contains 256 data points, then D=256. Different patterns from different signals can have different types of features. For simplicity, it is assumed that a common feature function $f$ is shared by all patterns from all signals.

In the presently disclosed technique, feature extraction is performed on several groups of signals, including annotated data (block 142 of FIG. 1), operating data (block 132) and monitoring data (block 151).

Generalization

After feature extraction, the classification problem may be represented using extracted features. A training sample is represented by (F, y), where the DN-dimensional combined feature vector is defined by $$F = [f(x_1)^T, f(x_2)^T, \ldots, f(x_N)^T]^T.$$

y is the class label: y=1 if the training sample represents the failure and y=−1 if the training sample represents a normal sample. There are a total of M normal training samples $(F_1, y_1), (F_2, y_2), \ldots, (F_M, Y_M)$ and L failure training samples $(F_{M+1}, Y_{M+1}), (F_{M+2}, Y_{M+2}), \ldots, (F_{M+L}, y_{m+L})$. Note that M can be zero if the user does not annotate any normal training data, and L is usually very small, for example, L=1. The task of classification is to learn a continuous evaluation function h(F) from the above M+L training samples such that a binary decision q (F) (1 for failure mode and −1 for normal data) can be made as follows $$q(F) = \begin{cases} 1 & \text{if } h(F) > 0, \\ -1 & \text{if } h(F) < 0. \end{cases}$$

Standard classifiers will not work well if they are simply trained with the training examples created so far because of the following challenges:

The number of training samples is extremely small for the failure case, such as L=1. That is far from enough to capture variations of patterns.
During monitoring, the same type of failure may be shown on different signals other than the signals $s_1, s_2, s_N$ selected by the user.

Two generalization techniques are proposed below, one to address each of the two issues noted above. One objective is to extract useful information from all operating data of the machine or similar machines even if they are not annotated (as failure or normal data) by the user.

Pattern Generalization

Although the annotated data cannot show how the pattern may vary in the future, it is likely that variations of a pattern appeared before in all operating data of the same machine or in operating data of other similar machines because such data is usually plentiful. Therefore, it is possible to search the operating data for such variations of a training pattern which are different but should still be similar to the training pattern.

In the presently described pattern generalization technique, patterns from all operating data are clustered (block 134 of FIG. 1). This clustering can be done independently of signals (or across all O signals) or can be done across similar signals (in the same signal cluster as described under signal generalization below). Only the first case is discussed here. Suppose that there is operating data for O signals for the last H time (for example, H=five years). A sliding window with a length of T may be used to extract pattern x from each of the O signals and for all H time. There will be a total of I patterns extracted. If I is too large, patterns may be randomly skipped to make I computationally manageable. The same feature extraction method $f$ described above is applied to each of the I patterns. Finally, a standard clustering method such as K-mean is applied to these I pattern feature vectors $f(x)$ to form K clusters. The number K can be specified by the user or by the algorithm automatically.

Intuitively, each cluster represents an alphabet that in turn is used to represent normal and faulty patterns (or pattern feature vectors). For example, one cluster may represent the drifting-up patterns and another cluster may represent the drifting-down patterns. Note that this clustering is done only once for all signals.

All I patterns have thus been clustered into K clusters. Each pattern cluster $c_k$ is now referred to as a symptom, where k=1, 2, . . . , K. A symptom $c_k$ is a high-level descriptor, as opposed to the low-level pattern x (or feature vector $f(x)$ of a pattern x). The confidence $P(c_k|x)$ of a pattern x belonging to symptom $c_k$ is also computed:

$$P(c_k \mid x) = \frac{p_k \exp(-dist(f(x)m, \mu_k))}{\sum_{j=1}^{K} p_j \exp(-dist(f(x), \mu_j))},$$

where $dist(f(x),\mu_k)$ is the distance between the pattern feature vector $f(x)$ and the cluster (symptom) mean $\mu_k$. $dist(f(x), \mu_k)$ can be a Euclidean distance or a Mahalanobis distance. $p_k$ indicates the weight of cluster $c_k$; it is usually proportional to the number of training patterns in this cluster and $p_1 + p_2 + \ldots + p_K = 1$. Intuitively, the closer a pattern feature vector $f(x)$ is to the cluster center $\mu_k$, the smaller the distance $dist(f(x),\mu_k)$ and the higher the confidence of x (or $f(x)$) belonging to cluster $c_k$.

Once the pattern clustering is complete, the annotated training examples may be re-interpreted. Let $$s \sim P(c_k|x)$$

denote that signal s shows symptom $c_k$ with a confidence of $P(c_k|x)$. The concept of symptom generalizes better than the original pattern s~x discussed above because now many similar patterns within the same cluster will have similar influences in making the final classification decision if they have similar confidences of belonging to the same cluster (or their distances from the cluster center $\mu_k$ are close). It may be said that a failure occurs if $$s_1 \sim P(c_1|x_1), \quad s_1 \sim P(c_2|x_1), \quad \ldots, \quad s_1 \sim P(c_K|x_1),$$
$$s_2 \sim P(c_1|x_2), \quad s_2 \sim P(c_2|x_2), \quad \ldots, \quad s_2 \sim P(c_K|x_2),$$
$$\vdots$$
$$s_N \sim P(c_1|x_N), \quad s_N \sim P(c_2|x_N), \quad \ldots, \quad s_N \sim P(c_K|x_N).$$

In other words, the pattern for each of the N signals is now represented by K confidence values, each value indicating the confidence of the pattern showing a symptom. The sum of these K values is equal to 1. If the user prefers a hard clustering decision wherein x is assigned to the most confident cluster $c_k$, then only one confidence $P(c_k|x)=1$ and all others are zero.

Now a KN-dimensional confidence vector P is defined for a training sample $$P = [P(c_1|x_1), P(c_2|x_1), \ldots, P(c_K|x_1), \ldots, P(c_1|x_N), P(c_2|x_N), \ldots, P(c_K|x_N)]^T.$$

The original TN-dimensional combined pattern vector $X = [x_1^T, x_2^T, \ldots, x_N^T]^T$ has been transformed to a DN-dimensional combined feature vector $F = [f(x_1)^T, f(x_2)^T, \ldots, f(x_N)^T]^T$, and finally to the KN-dimensional confidence vector P.

Signal Generalization

The same type of failure can involve different monitored signals from the signals selected by the user during training. For example, in the blade path component of a gas turbine, multiple temperature sensors are usually installed at different locations. Because they are all measuring the temperature nearby, they are highly correlated. During a blade path component failure such as a crack on the wall, some temperature sensors may drift down. In another such event, similar symptoms may occur on some other temperature sensors depending on the location of the failure. Therefore, there is a need to identify the same type of failure even when it is shown on a different set of signals.

The presently disclosed technique addresses this problem by clustering signals based on their correlation (block 133 of FIG. 1). First, a pair-wise signal correlation is calculated based on the operating data. Both linear and nonlinear correlation algorithms may be used. Second, signals are clustered using methods such as hierarchical clustering. To ensure that this signal generalization makes sense, this clustering is required to be very selective: signals are grouped only if they are really similar. This can be achieved by a very high similarity threshold in the hierarchical clustering. Suppose a total of R clusters are found and let r(s) denote the signal cluster for signal s, where r(s)=1, 2, . . . , R.

g(s) is used to indicate any signal from the same cluster to which the signal s belongs:

$$g(s) = s' \cdot s \cdot t \cdot r(s') = r(s).$$

A new and final interpretation of a training sample is now possible, yielding the following confidence vector represented by block 143 of FIG. 1. A failure occurs if $$g(s_1) \sim P(c_1|x_1), \quad g(s_1) \sim P(c_2|x_1), \quad \ldots, \quad g(s_1) \sim P(c_K|x_1),$$
$$g(s_2) \sim P(c_1|x_2), \quad g(s_2) \sim P(c_2|x_2), \quad \ldots, \quad g(s_2) \sim P(c_K|x_2),$$
$$\vdots$$
$$g(s_N) \sim P(c_1|x_N), \quad g(s_N) \sim P(c_2|x_N), \quad \ldots, \quad g(s_N) \sim P(c_K|x_N),$$
$$\text{s.t.} \quad g(s_1) \neq g(s_2) \neq \cdots \neq g(s_N).$$

The last term ensures that a signal is only used once in describing the failure. The major difference between defining a failure with g (s) and defining a failure with s is the following. In using s, only the signals specified by the user will be checked against the failure. However, by using g (s), because there are multiple combinations of signals besides the combination set by the user, satisfying the failure definition, all of them will be checked against the failure. For example, suppose that signal $s_1$ and $s_2$ are in the same signal cluster 1 and that signal cluster 1 has three signals including $s_1$ and $S_2$. During monitoring, every two-signal combination from this three-signal cluster must be be evaluated against this type of failure. If the number of signal clusters R is equal to O, the total number of signals, each signal forms its own cluster and thus g (s)=s. Therefore, the above interpretation may also include the case where no signal clustering is performed.

Note that the user can also interact with the signal clustering results by manually moving signals between clusters or removing or adding clusters. The signal generalization can be easily switched off so every signal forms its own cluster.

Two-Class Classification

During the training stage, shown as block 144 of FIG. 1, each training sample is represented by (P, y), where P is the KN-dimensional confidence vector defined above. y is the class label: 1 for a failure and −1 for a normal sample. In particular, the following classifiers are considered in different cases:

If there is no normal training sample (M=0) and there are more than one failure training samples (L>1), a one-class support vector classifier is used.

If there is no normal training sample (M=0) and there are only one failure training sample (L=1), a Naive Bayes classifier is used because a one-class support vector machine does not have an advantage in this case.

If there are some normal training samples (M>0), a standard two-class support vector machine or AdaBoost classifier is used.

After training, a continuous evaluation function h (P) is obtained for a confidence vector P. The classifier q (P) is defined as follows.

$$q(P) = \begin{cases} 1 & \text{if } h(P) > 0, \\ -1 & \text{if } h(P) < 0. \end{cases}$$

If h (P)>0, P and its associated pattern is classified as a failure; otherwise, it is classified as normal. Note that the higher the value h (P) is, the more likely it is a failure.

During the monitoring stage, at every data point t, a pattern is extracted from every signal based on the past T time window from t. A confidence of that pattern belonging to a symptom is then calculated at block 152 of FIG. 1. The results are arranged in a table similar to table 200 shown in FIG. 2.

Figure 2:
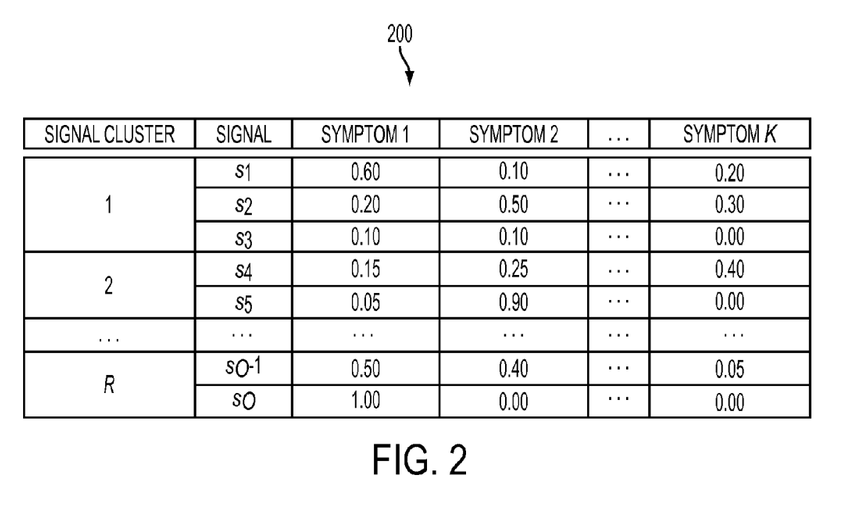
FIG. 2 is an example table showing confidence levels for various signal classifications in accordance with one embodiment of the invention.

Suppose that the user selects signals $s_1$, $s_2$ and $s_4$ to represent the failure. In table 200, $s_1$, $s_2$ and $s_3$ belong to the same signal cluster 1; $s_4$ and $s_5$ belong to the same signal cluster 2. During monitoring, $s_1$, $s_2$ can be replaced by any two signals from signal cluster 1, and there are three possibilities. $s_4$ may be replaced by any signal from signal cluster 2, and there are two possibilities. So there are a total of 3×2=6 possibilities or hypotheses. Each of the 6 hypotheses will form its corresponding confidence vector P from table 200. The dominant hypothesis with the largest evaluation function value h (P), represented by block 153 of FIG. 1, will be used to make the final classification decision 154.

The above method may become computationally very expensive if there are a large number of signal clusters and the average number of signals per cluster is large. Thus, the following greedy algorithm may be used. First, a hypothesis is formed by either using the user-specified signals during training or randomly selected signals. Each signal in this hypothesis is then replaced by another unused signal within the same signal cluster that achieves the highest h (P). Such replacement is done only in one scan of all signals used in the hypothesis.

Multi-Class Classification

So far, the focus has been on how to make a decision between a failure y=1 and normal data y=−1. In practice, there are usually B>1 number of possible failures. Therefore, it is necessary to train an evaluation function $h_b$ (P) for failure b, where b=1, 2, . . . , B. Training $h_b$ (P) is very similar to that described previously, except that now the normal training samples and training samples from other B−1 failures are treated as a combined negative training sample set (where label y=−1). The goal is to discriminate failure b (where label y=1) from the combined negative training samples. Following the same procedure, the evaluation function $h_b(P)$ is obtained for every b. The final decision is made differently in the following different two cases.

Multi-label classification: in this case, it is assumed that different failures can happen at the same time. Therefore, the same test sample can be classified into multiple failures. In this case, there is a binary classifier $q_b$ (P) for each failure b and the decision of P belonging to failure b is made independently $$q_b(P) = \begin{cases} 1 & \text{if } h_b(P) > 0, \\ -1 & \text{if } h_b(P) < 0. \end{cases}$$

Single-label classification: in this case, it is assumed that only one failure can happen at one time. Therefore, the most possible failure for a test sample must be selected. There is a single classifier q(P) that makes a single decision from failure label 1, 2, . . . , B or normal data label −1 based on the maximum $h_b(P)$:

$$q(P) = \begin{cases} b^* = \text{argMax}_b h_b(P) & \text{if } \text{Max}_b h_b(P) > 0, \\ -1 & \text{if } \text{Max}_b h_b(P) < 0. \end{cases}$$

System

Figure 3:
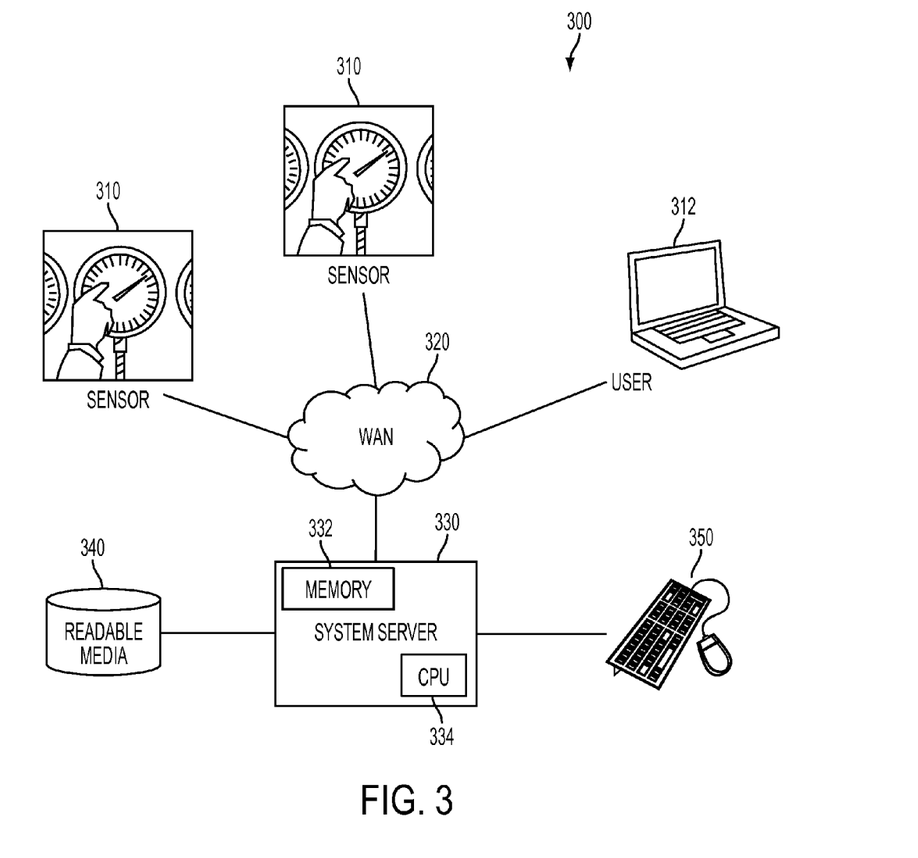
FIG. 3 is a schematic diagram showing a computer system for instantiating a tool in accordance with one embodiment of the invention.

The elements of the methodology as described above may be implemented in a computer system comprising a single unit or a plurality of units linked by a network or a bus. An exemplary system 300 is shown in FIG. 3.

A system server 330 may be a mainframe computer, a desktop or laptop computer or any other device capable of processing data. The system server 330 receives data from any number of data sources that may be connected to the computer, including a wide area data network (WAN) 320.

For example, the system server 330 may receive signals from the sensors 310, or may receive input from a user 312 through the WAN 320.

The system server 330 includes a central processing unit (CPU) 334 and a memory 332. The server may be connected to an input and/or output device 350. The input may be a mouse, network interface, touch screen, etc., and the output may be a liquid crystal display (LCD), cathode ray tube (CRT) display, printer, etc. Alternatively, commands containing input/output data may be passed via the network 320. The server 330 can be configured to operate and display information by using, e.g., the input and output devices 350 to execute certain tasks.

The CPU 334, when configured using software according to the present disclosure, includes modules that are configured for performing one or more methods for machine condition monitoring as discussed herein.

The memory 332 may include a random access memory (RAM) and a read-only memory (ROM). The memory may also include removable media such as a disk drive, tape drive, memory card, etc., or a combination thereof. The RAM functions as a data memory that stores data used during execution of programs in the CPU 334; the RAM is also used as a work area. The ROM functions as a program memory for storing a program executed in the CPU 334. The program may reside on the ROM or on any other tangible or non-volatile computer-usable medium as computer readable instructions stored thereon for execution by the CPU or another processor to perform the methods of the invention. The ROM may also contain data for use by the program or other programs.

The above-described method may be implemented by program modules that are executed by a computer, as described above. Generally, program modules include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like. The disclosure may also be employed in distributed computing environments, where tasks are performed by remote processing devices that are linked through a communications network. In a distributed computing environment, modules may be located in both local and remote memory storage devices.

An exemplary processing module for implementing the methodology above may be hardwired or stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art.

The term "computer-readable medium" as employed herein refers to any tangible machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. Such media excludes propagated signals, which are not tangible. Cached information is considered to be stored on a computer-readable medium. Common expedients of computer-readable media are well-known in the art and need not be described in detail here.

The foregoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

What is claimed is:

1. A method of machine condition monitoring, comprising:
receiving, by a computer, historic operating data including operating data from O signals over time;
extracting I patterns x, each pattern x being extracted from operating data from an individual signal;
clustering the I patterns into K pattern clusters $c_k$ based on similarities;
clustering the O signals into R signal clusters based on correlations among the operating data from the O signals;
receiving an annotated training data sample containing training data from N signals selected from the O signals, the training data having at least one marked failure time period;
creating a K×N confidence matrix containing K confidence values for each of the N signals, each confidence value representing a confidence that a pattern x extracted from data in the marked failure time period of a signal belongs to one of the K pattern clusters;
training a classifier using the K×N confidence matrix;
receiving, by a computer, a monitored data sample including monitored data from the O signals; and
classifying, by the classifier running on a computer, the monitored data sample as indicating or not indicating a failure based on confidence vectors computed for a plurality of sub-combinations of the monitored data sample, the sub-combinations each having data representing all of the N signals, at least one of the N signals being represented in at least one sub-combination by data from another signal in the same signal cluster $c_k$ as the represented signal.

2. A method as in claim 1, wherein extracting I patterns from the individual signals in the operating data comprises using a sliding time window of fixed length.

3. A method as in claim 1, wherein clustering the I patterns into K pattern clusters and clustering the O signals into R signal clusters further comprises:
for each of the I patterns, extracting scalar features describing the pattern; and
using the scalar features to cluster the patterns and the signals.

4. A method as in claim 1, wherein clustering the I patterns into K pattern clusters is performed across operating data from all O signals.

5. A method as in claim 1, wherein clustering the I patterns into K pattern clusters is performed across operating data from signals in a same signal cluster.

6. A method as in claim 1, wherein clustering the I patterns into K pattern clusters comprises applying K-mean clustering to form the clusters.

7. A method as in claim 1, wherein clustering the O signals into R signal clusters further comprises:
   calculating pair-wise signal correlation based on the historic operating data; and
   clustering the signals using hierarchical clustering.

8. A method as in claim 1, wherein one of the K confidence values for a particular signal equals 1, and the remaining of the K confidence values equal zero.

9. A method as in claim 1, wherein, for each of the N signals, a sum of the K confidence values equals 1.

10. A method as in claim 1, wherein classifying the monitored data sample further comprises:
   applying a greedy algorithm to identify a dominant confidence vector; and
   determining whether an evaluation function value for the dominant confidence vector exceeds a threshold.

11. A method of machine condition monitoring, comprising:
   receiving, by a computer, historic operating data including operating data from O signals over time;
   extracting I patterns x, each pattern x being extracted from operating data from an individual signal;
   clustering the I patterns into K pattern clusters $c_k$ based on similarities;
   clustering the O signals into R signal clusters based on correlations among the operating data from the O signals;
   receiving an annotated training data sample containing training data from N signals selected from the O signals, the training data having at least one marked failure time period;
   creating a K×N confidence matrix containing K confidence values for each of the N signals, each confidence value representing a confidence that a pattern x extracted from data in the marked failure time period of a signal belongs to one of the K pattern clusters;
   training a classifier using the K×N confidence matrix;
   receiving, by a computer, a monitored data sample including monitored data from the O signals; and
   classifying, by the classifier running on a computer, the monitored data sample as indicating or not indicating a failure based on confidence vectors computed for a plurality of sub-combinations of the monitored data sample, the sub-combinations each having data representing all of the N signals, at least one of the N signals being represented in at least one sub-combination by data from another signal in the same signal cluster $c_k$ as the represented signal;
   wherein each confidence value representing a confidence that pattern x belongs to pattern cluster $c_k$ is defined by:

$$\frac{p_k \exp(-dist(f(x), \mu_k))}{\sum_{j=1}^{K} p_j \exp(-dist(f(x), \mu_j))},$$

wherein $p_k$ is a weight of cluster $c_k$, and $dist(f(x), \mu_k)$ is a distance between a pattern feature vector $f(x)$ describing the pattern x and a mean $\mu_k$ of the cluster $c_k$.

12. A non-transitory computer-usable medium having computer readable instructions stored thereon for execution by a processor to perform a method of machine condition monitoring, the method comprising:
   receiving historic operating data including operating data from O signals over time;
   extracting I patterns x, each pattern x being extracted from operating data from an individual signal;
   clustering the I patterns into K pattern clusters $c_k$ based on similarities;
   clustering the O signals into R signal clusters based on correlations among the operating data from the O signals;
   receiving an annotated training data sample containing training data from N signals selected from the O signals, the training data having at least one marked failure time period;
   creating a K×N confidence matrix containing K confidence values for each of the N signals, each confidence value representing a confidence that a pattern x extracted from data in the marked failure time period of a signal belongs to one of the K pattern clusters;
   training a classifier using the K×N confidence matrix;
   receiving a monitored data sample including monitored data from the O signals; and
   classifying, by the classifier, the monitored data sample as indicating or not indicating a failure based on confidence vectors computed for a plurality of sub-combinations of the monitored data sample, the sub-combinations each having data representing all of the N signals, at least one of the N signals being represented in at least one sub-combination by data from another signal in the same signal cluster $c_k$ as the represented signal.

13. A non-transitory computer-usable medium as in claim 12, wherein extracting I patterns from the individual signals in the operating data comprises using a sliding time window of fixed length.

14. A non-transitory computer-usable medium as in claim 12, wherein clustering the I patterns into K pattern clusters and clustering the O signals into R signal clusters further comprises:
   for each of the I patterns, extracting scalar features describing the pattern; and
   using the scalar features to cluster the patterns and the signals.

15. A non-transitory computer-usable medium as in claim 12, wherein clustering the I patterns into K pattern clusters is performed across operating data from all O signals.

16. A non-transitory computer-usable medium as in claim 12, wherein clustering the I patterns into K pattern clusters is performed across operating data from signals in a same signal cluster.

17. A non-transitory computer-usable medium as in claim 12, wherein clustering the I patterns into K pattern clusters comprises applying K-mean clustering to form the clusters.

18. A non-transitory computer-usable medium as in claim 12, wherein clustering the O signals into R signal clusters further comprises:
   calculating pair-wise signal correlation based on the historic operating data; and
   clustering the signals using hierarchical clustering.

19. A non-transitory computer-usable medium as in claim 12, wherein each confidence value representing a confidence that pattern x belongs to pattern cluster $c_k$ is defined by:

$$\frac{p_k \exp(-dist(f(x), \mu_k))}{\sum_{j=1}^{K} p_j \exp(-dist(f(x), \mu_j))},$$

wherein $p_k$ is a weight of cluster $c_k$, and $dist(f(x), \mu_k)$ is a distance between a pattern feature vector $f(x)$ describing the pattern x and a mean $\mu_k$ of the cluster $c_k$.

20. A non-transitory computer-usable medium as in claim 12, wherein one of the K confidence values for a particular signal equals 1, and the remaining of the K confidence values equal zero.

21. A non-transitory computer-usable medium as in claim 12, wherein, for each of the N signals, a sum of the K confidence values equals 1.

22. A non-transitory computer-usable medium as in claim 12, wherein classifying the monitored data sample further comprises:
   applying a greedy algorithm to identify a dominant confidence vector; and
   determining whether an evaluation function value for the dominant confidence vector exceeds a threshold.

* * * * *